March 4, 1969  D. REDFIELD  3,431,512

JUNCTION LASER WITH CONTROLLED OUTPUT

Filed June 29, 1964

INVENTOR.
DAVID REDFIELD
BY Harrie M. Humphreys
ATTORNEY

United States Patent Office 3,431,512
Patented Mar. 4, 1969

3,431,512
JUNCTION LASER WITH CONTROLLED OUTPUT
David Redfield, Tarrytown, N.Y., assignor to Union Carbide Corporation, a corporation of New York
Filed June 29, 1964, Ser. No. 378,584
U.S. Cl. 331—94.5
Int. Cl. H01s 3/10
2 Claims

ABSTRACT OF THE DISCLOSURE

A junction laser is described in which a transparent insulating region of the same semiconductor material which comprises the body of the junction laser is disposed in direct contact with and aligned with the junction at the output end of the junction laser, together with means for applying an electrical control signal across the transparent insulating region to modulate the intensity of the emitted laser beam.

---

This invention relates to lasers. More particularly the invention is directed to an improved junction laser in which the laser output beam can be easily controlled.

Junction lasers, particularly those constructed from the semiconductor material gallium arsenide (GaAs) are well known devices. One potentially attractive application of junction lasers would be the use of the laser output beam as an information carrier. Such use, however, requires that the intensity of the laser output beam must be controlled (modulated) in some manner. Heretofore, such control was generally obtained by modulation of the input current supplied to the junction laser device. This type of modulation is extremely inefficient because of the relatively high current, and therefore, the relatively high power in the typical electric input system of a junction laser.

It is an object of this invention to provide a controllable junction laser which is not subject to the disadvantages outlined above.

Another object of the invention is to provide a junction laser whose output can be readily modulated.

A further object of the invention is to provide a junction laser whose output can be controlled by means of a relatively low power electric signal.

These and other objects and advantages of the invention will be apparent from the following description and appended claims.

Figure 1:
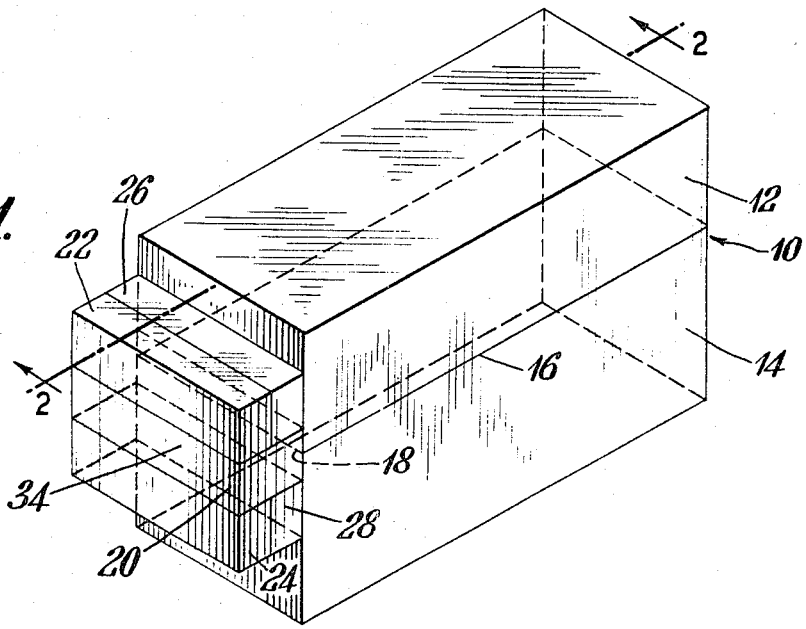
FIGURE 1 is a schematic isometric view of a junction laser of this invention.

Junction lasers have been described in the scientific literature. See, for example, "Proceedings of the Third International Congress on Quantum Electronics," Edited by P. Grivet, Columbia Univ. Press, 1963. The typical junction laser comprises a rectangular parallelepiped constructed from a semiconductor material, typically gallium arsenide. One region of the semiconductor material is doped to produce N-type conductivity and the other region is doped to produce P-type conductivity. (Doping is the intentional introduction of selected impurities into a semiconductor material in order to alter the electrical or optical properties of the pure semiconductor. See, for example, "Compound Semiconductors", vol. 1, Edited by R. K. Willardson and H. L. Goering, Reinhold Publ., 1962.) The regions of opposite conductivity are separated by a planar junction which is substantially parallel to two of the faces of the parallelepiped. Two faces of the parallelepiped perpendicular to the junction are smooth and parallel. The other faces perpendicular to the junction are usually roughened or otherwise rendered non-parallel. The junction and the smooth parallel end faces provide the optical cavity essential for laser action. A suitable power supply is provided to produce a flow of current through the semiconductor material and across the junction. The laser beam is emitted from the junction at one of the smooth parallel faces, generally referred to as the output end of the junction laser. Junction lasers have been typically operated at low temperatures, for example, at the temperature of liquid nitrogen or liquid helium.

According to the present invention, an improved and controllable junction laser is obtained by providing a transparent insulating region of the same semiconductor material which comprises the body of the junction laser extending across and aligned with the junction at the output end of the junction laser, and by further providing means for applying an electric control voltage across this transparent insulating region of the same semiconductor. The control signal can then be used to modulate the intensity of the laser beam emitted from the output end of the junction.

Without being bound by any particular theory or mechanism, the present invention can be explained by analogy to the physical principle that electric fields can alter the optical absorption properties of solid materials. Solid materials are characterized by the so-called fundamental optical absorption edge, the fundamental frequency of which is not highly dependent on impurity concentration, crystal defects, or the like. The ability to vary the frequency of the optical absorption edge by means of electric fields has been demonstrated for a number of semiconducting materials including lead iodide, mercuric iodide or gallium arsenide. See, for example, Williams, Physical Reviews, vol. 126, pp. 442–446, Apr. 15, 1962, and Moss, Journal of Applied Physics, supplement to vol. 32, pp. 2136–2139, October 1961. The output beam of a junction laser has a frequency close to (but not identical with) the frequency of the fundamental optical absorption edge of the semiconductor material from which the laser is constructed. This invention is based on the discovery that the light beam produced by a junction laser can be controlled by means of electric fields, and that the controlling effect of such electric fields is most pronounced in the frequency range in which junction lasers operate.

Figure 2:
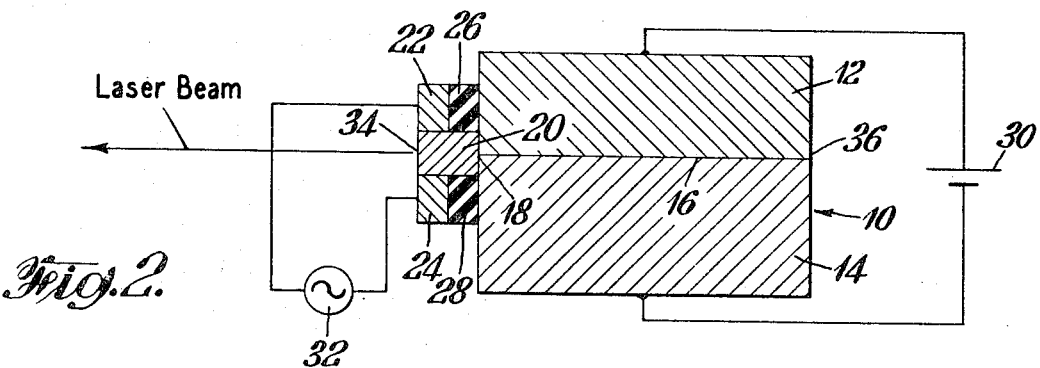
FIGURE 2 is a schematic cross-sectional view of the embodiment of FIGURE 1, taken along the line 2—2.

One embodiment of the present invention is illustrated schematically in FIGURES 1 and 2. FIGURE 1 is an isometric view of a junction laser of this invention and FIGURE 2 is a cross-sectional view of this junction laser taken perpendicular to the plane of the junction along the line 2—2 of FIGURE 1. Referring to FIGURES 1 and 2 together, the device comprises a rectangular parallelepiped 10 of semiconductor material, the upper region 12 of the semiconductor material having P-type conductivity and the lower region 14 having N-type conductivity. The planar junction between the two regions is designated by the line 16. The laser beam emerges from the output end 18 of the junction. A region of transparent insulating semiconductor material 20 extends across the entire length of the output end of the junction and is aligned with the junction. The region of transparent insulating semiconducting material is in direct contact with the output end 18 of the junction. Electrodes 22 and 24 are disposed on either side of the transparent insulating region 20 and are substantially parallel to each other so that a uniform field can be applied across the transparent insulating region. The electrodes are electrically isolated from the doped semiconductor body of the junction laser 30 is provided for the junction laser itself, and a control voltage 32 is applied to the electrodes 22 and 24 by conventional ohmic contacts.

With further reference to the device of FIGURES 1 and 2, the junction laser can be constructed from any suitable semiconductor material such as gallium arsenide, indium arsenide, indium antimonide and mixtures of these materials with each other or with gallium phosphide.

The region of transparent insulating semiconducting material must be of the same material as is used in constructing the main junction laser crystal. The transparent semiconductor region 20 can be rendered insulating by using pure (undoped) semiconductor material or by employing compensating doping of the semiconductor material. Compensating doping is the use of substantially equal concentrations of N-type and P-type dopants.

The electrodes 22 and 24 can be conveniently constructed from indium, zinc, selenium and the like. These electrodes are insulated from the junction laser crystal by insulating regions designated 26 and 28 in FIGURES 1 and 2. The insulating regions can be, for example, conventional electrical insulators (resins, plastics, ceramics and the like), insulating semiconductors such as pure gallium arsenide, pure silicon and the like, or an insulating air gap.

Preferably, the separation of the electrodes 22 and 24 from the main laser crystal 10 provided by insulating regions 26 and 28 should be at least as great as the distance between electrodes 22 and 24 across transparent insulating region 20. Typically the spacing between electrodes 22 and 24 and crystal 10, and the distance between electrodes 22 and 24 across region 20 is on the order of 10 to 20 microns.

Alternatively, the transparent insulating semiconductor region 20 and the control electrodes 22 and 24 can be constructed from a single piece of semiconductor material in which the center region which extends across the junction is undoped, while doped regions on opposite sides of the center region serve as electrodes.

In the embodiment of the invention shown in FIGURES 1 and 2, the main crystal 10 and the insulating crystal 20 together comprise the laser, since each contributes one reflecting surface to the optical cavity in which the laser beam is produced. The reflecting surface 34 of region 20 must, of course, be smooth and substantially parallel with the opposite face 36 of the main laser crystal.

The control voltage 32 can be provided by a direct current source, an alternating current source, a pulsed voltage source or a combination of these sources, a typical combination being a D.C. bias with a superimposed A.C. signal.

Figure 3:
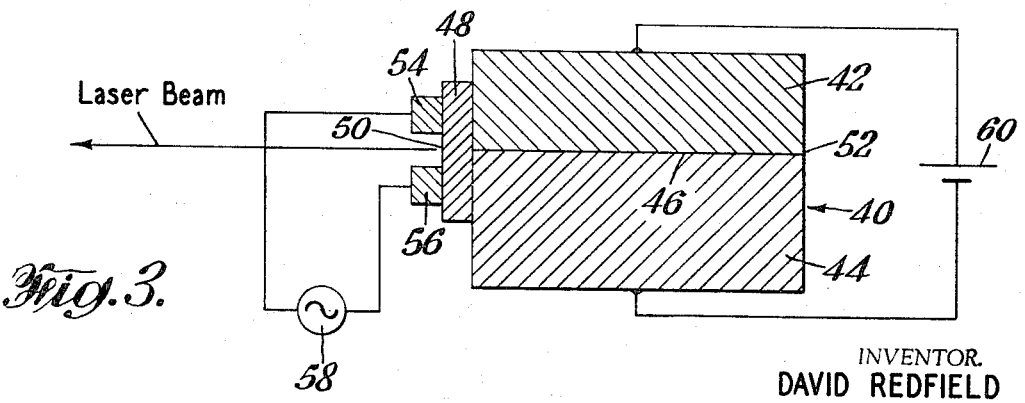
FIGURE 3 is a schematic cross-sectional view of another embodiment of this invention.

Another embodiment of the present invention is illustrated in FIGURE 3 which represents a cross-sectional schematic view of a junction laser. In this embodiment, the control device can be fabricated as part of the main laser crystal, rather than in a separate unit, as in the case of the control device of FIGURES 1 and 2. The laser of FIGURE 3 comprises a semiconductor crystal 40, the upper region 42 having P-type conductivity and the lower region 44 having N-type conductivity. The planar junction between the P-type and N-type regions is represented by the line 46. A transparent insulating region 48 constructed of the same material as the laser crystal 40 extends across the output end of the junction 46 and overlaps the regions 42 and 44 on either side of junction 46. Region 48 is preferably deposited epitaxially on the face of laser crystal 40. The reflecting surface 50 of region 48 must be smooth and substantially parallel to the opposite face 52 of the main laser crystal 40. A pair of conventional ohmic metal electrodes 54 and 56 are disposed across the outer surface 50 of region 48 substantially parallel to and on opposite sides of the output end of junction 46. Electrodes 54 and 56 are separated to provide a gap across outer surface 50 through which the laser beam emerges. The control signal 58 is applied to electrodes 54 and 56 and a power supply 60 is provided for the junction laser.

In the embodiment of FIG. 3, the electrodes 54 and 56 are insulated from the main laser crystal 40 by transparent insulating region 48.

In the device of FIGURES 1 and 2, the device of FIGURE 3, and other modifications of the present invention, the control signal varies the electric field across a relatively small fraction of the path of the light within the laser cavity, namely, across that portion of the light path within the transparent insulating region of semiconductor material.

In a further embodiment of this invention, a permanent "bias" field can also be incorporated into the modulating region to increase the sensitivity of the laser to the applied modulating field. This can be done by judicious compensative doping in the modulating (control) region, since fields due to charged impurities can produce the same type of effect as an externally applied electric field.

It is an advantage of the present invention that the modulating field need be applied only to a relatively small portion of the light path. This is because many traversals of the entire optical cavity are necessary for laser action and therefore the effect of an applied field to only a small portion of the light path provides sensitive control. Further, the use of a small modulation region permits use of a high frequency control signal, because the capacitance between the control electrodes is relatively small.

The present invention has the additional advantage that the control signal can operate at relatively low power with respect to the power supply of the laser itself. A typical junction laser of gallium arsenide operates with an input current of about 10 amperes and relatively high power consumption. An alternating current control signal of the type used in the present invention can operate with a total power requirement of from .01 to .001 or less of the required laser input power.

Thus, the present invention provides an efficient, low power method for modulating the intensity of the output beam from a junction laser.

What is claimed is:

1. In a junction laser constructed from a doped semiconductor material, the improvement which comprises: a transparent insulating region of the same semiconductor material as said junction laser extending across, in direct contact with and aligned with the output end of the junction of said junction laser, and contributing one reflecting surface to the optical cavity of said laser; and means for applying an electrical control signal across said transparent insulating region to modulate the output beam of said laser.

2. In a junction laser constructed from a doped semiconductor material, the improvment which comprises: a transparent insulating region of the same semiconductor material as said junction laser extending across, in direct contact with and aligned with the output end of the junction of said junction laser, and contributing one reflecting surface to the optical cavity of said laser; a pair of electrodes disposed on opposite sides of said insulating region and on opposite sides of said junction, said electrodes being electrically insulated from said junction laser; and an alternating current control signal applied across said transparent insulating region by means of said electrodes to modulate the output beam of said laser.

References Cited

UNITED STATES PATENTS 3,281,713 10/1966 Soules _____ 331—94.5
3,295,911 3/1966 Ashkin et al. _____ 331—94.5
3,259,016 7/1966 Rosenblum _____ 331—94.5

JEWELL H. PEDERSEN, *Primary Examiner.*

E. BAUER, *Assistant Examiner.*

U.S. Cl. X.R.

317—235; 332—7.51; 350—160